Feb. 23, 1926.　　　　　　　　　　　　　　　　1,574,207

F. SCHAEFER

FORGED BRAKE LEVER

Filed May 18, 1925

WITNESSES

A.B.Wallod.

INVENTOR

Frederic Schaefer
by Winter, Brown & Critchlow
his attorneys.

Patented Feb. 23, 1926.

1,574,207

UNITED STATES PATENT OFFICE.

FREDERIC SCHAEFER, OF PITTSBURGH, PENNSYLVANIA.

FORGED BRAKE LEVER.

Application filed May 18, 1925. Serial No. 30,957.

*To all whom it may concern:*

Be it known that I, FREDERIC SCHAEFER, a citizen of the United States, and a resident of Pittsburgh, in the county of Allegheny and State of Pennsylvania, have invented a new and useful Improvement in Forged Brake Levers, of which the following is a specification.

The invention relates to brake levers for use in the brake riggings or trucks for railway cars and coaches.

A brake lever for this purpose is customarily pivoted intermediate of its ends in a slotted yoke through which it extends, and it lies in a vertical or downwardly inclined position, having one of its ends attached to a rod which is connected to the brake cylinder mechanism, and its other end connected to a rod for actuating brake beams. If the pivot pin of such a brake lever should break, as it sometimes does, the brake lever slips downwardly through its slotted yoke, and either it or the rod connected to its lower end falls on a rail and may cause derailment.

The object of the invention is to provide a forged brake lever of maximum strength in proportion to its weight, and which is so constructed that in case its pivot pin should break, it will not fall downwardly through its slotted yoke and cause derailment; and a forged brake lever, characterized as explained, which may be economically manufactured.

Figure 1:
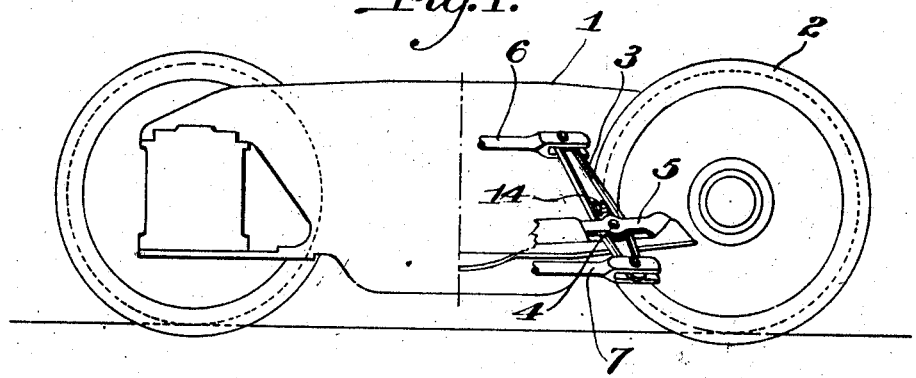
Figure 2:
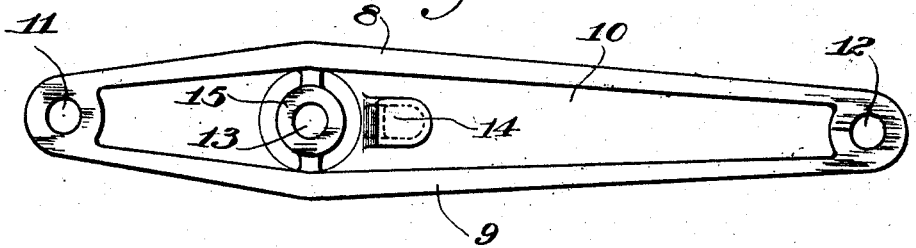

The invention is illustrated in the accompanying drawings of which Fig. 1 is a somewhat diagrammatic view illustrating an installation of a brake lever; Fig. 2 a face view of a brake lever provided according to this invention; and Fig. 3 a central sectional view of a stack of brake levers embodying the invention.

Having reference first to Fig. 1, a railway truck comprising a frame 1 and wheels 2 is shown as having a brake lever 3 pivotally connected by a pin 4 to a slotted yoke 5 through which it extends. The brake lever is indicated as being in a downwardly inclined position, with its upper end pivotally attached to a rod 6 which extends to a brake cylinder, and its lower end pivotally attached to a rod 7 which is indirectly connected to a brake beam.

According to this invention a forged brake lever is provided having flanges 8 and 9, the sides of which lie in common planes, a central web 10, end eyes 11 and 12 for attachment to brake rods, and an intermediate eye 13 for pivotally supporting it. The flanges 8 and 9 are preferably formed at and adjacent to intermediate eye 13 to conform to the general contour of a uniform stress curve, thereby reducing to a minimum the amount of metal required for the manufacture of the lever.

To prevent a lever from falling through a slotted yoke 5 in case the pivot pin 4 extending through its intermediate eye 13 should break, web 10 of the lever is provided with a concave-convex projection 14 adjacent to eye 13, the projection extending beyond the common plane of the end of boss 15 surrounding the eye and of the sides of flanges 8 and 9. As shown in Fig. 1, projection 14 is in a position to engage an arm of slotted yoke 5 in case pivot pin 4 should break.

Figure 3:
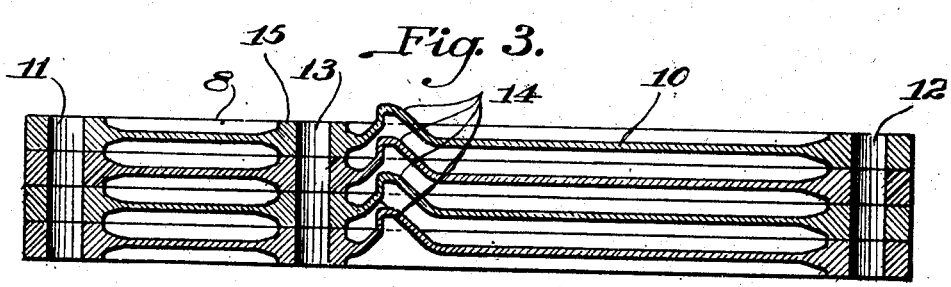

In the manufacture of forged brake levers it is necessary to anneal them after the forging operation, and to do this economically it is desirable to stack the brake levers one upon the other as illustrated in Fig. 3. Furthermore, during the annealing operation it is necessary to support each brake lever throughout its entire length to prevent warpage while it is heated. By providing projections 14 which are concave on one side, these projections nest with each other, in the manner illustrated, when the brake levers are stacked for annealing with the sides of their flanges fully resting one upon the other, and this prevents such warpage as would occur if the projections were so constructed as to make it impossible for the brake levers to be piled in the manner shown in Fig. 3. In addition to this, the metal forming projections 14 may be of the same thickness as web 10, which is of material advantage in the manufacture of the levers.

I claim as my invention:

A forged lever for railway brakes having a central web and flanges formed integrally with and at the edges of said web and having end eyes and an intermediate eye, said web being provided adjacent to said intermediate eye with a concave-convex yoke-engaging projection extending beyond the plane of the sides of the flanges and of the boss surrounding said intermediate eye, the metal forming said projection being of substantially the same thickness as the web, and the convex side of the projection of one brake lever nesting in the concave side of a second brake lever when said second brake lever is stacked upon the first-named brake lever.

In testimony whereof, I sign my name.

FREDERIC SCHAEFER.